(12) United States Patent  
Malmberg

(10) Patent No.: US 6,431,348 B2
(45) Date of Patent: Aug. 13, 2002

(54) DEVICE FOR STEERING A CONVEYOR BELT

(75) Inventor: Mats Anders Malmberg, Trelleborg (SE)

(73) Assignee: Svedala Trellex AB, Trelleborg (SE)

( * ) Notice: Subject to any disclaimer, the term of this patent is extended or adjusted under 35 U.S.C. 154(b) by 0 days.

(21) Appl. No.: 09/764,760

(22) Filed: Jan. 16, 2001

Related U.S. Application Data

(63) Continuation of application No. PCT/SE00/01081, filed on May 26, 2000.

(30) Foreign Application Priority Data

Sep. 3, 1999 (SE) ................................................ 9903134

(51) Int. Cl.[7] .............................................. B65G 39/16
(52) U.S. Cl. ................................. 198/806; 198/810.03
(58) Field of Search ............................ 198/806, 810.03, 198/807

(56) References Cited

U.S. PATENT DOCUMENTS

| 2,160,057 A | * | 5/1939 | Carus et al. | 198/806 |
| 2,725,757 A | * | 12/1955 | Murphjy | 198/806 |
| 3,058,574 A | * | 10/1962 | Gianukos | 198/806 |
| 3,303,924 A | * | 2/1967 | Hartzell, Jr. | 198/806 |
| 3,593,841 A | * | 7/1971 | Leo | 198/806 |
| 3,621,728 A | * | 11/1971 | Steorts, Jr. | 198/806 |
| 4,506,782 A | * | 3/1985 | Jeanneret et al. | 198/806 |
| 4,936,441 A | * | 6/1990 | Akesaka | 198/626.2 |
| 5,609,241 A | * | 3/1997 | Shaw | 198/806 |
| 5,735,409 A | * | 4/1998 | Malmberg | 209/399 |
| 5,950,806 A | * | 9/1999 | Warneke | 198/806 |
| 6,116,410 A | * | 9/2000 | Malmberg | 198/806 |
| 6,173,830 B1 | * | 1/2001 | Cumberlege et al. | 198/842 |
| 6,186,317 B1 | * | 2/2001 | Hovsto et al. | 198/806 |
| 6,189,280 B1 | * | 2/2001 | Malmberg | 52/506.05 |
| 6,246,858 B1 | * | 6/2001 | Condello et al. | 399/329 |
| 6,247,580 B1 | * | 6/2001 | Hovsto et al. | 198/806 |
| 6,279,733 B2 | * | 8/2001 | Eltvedt | 198/816 |

FOREIGN PATENT DOCUMENTS

| DE | 195 14 894 | 4/1995 |
| WO | WO 92/06908 | 4/1992 |
| WO | WO 95/14627 | 6/1995 |
| WO | WO 98/19943 | 5/1998 |

* cited by examiner

*Primary Examiner*—Christopher P. Ellis
*Assistant Examiner*—Rashimi K Sharma
(74) *Attorney, Agent, or Firm*—Kinney & Lange, P.A.

(57) ABSTRACT

A device steers a conveyor belt (11) and centers the same relative to the intended path of travel of the belt. A belt position detector (22, 23) determines whether the conveyor belt has strayed from its intended path. A belt support roller (24) which is adapted to engage and roll against the belt and which is pivotable relative to the belt returns the conveyor belt to its intended path. The belt position detector (22,23) and the belt support roller (24) are arranged on a roller cradle (21) which is connected to a frame (29) by means of inclined links (30) for pivoting and setting the belt support roller (24) in a pivoting position.

8 Claims, 4 Drawing Sheets

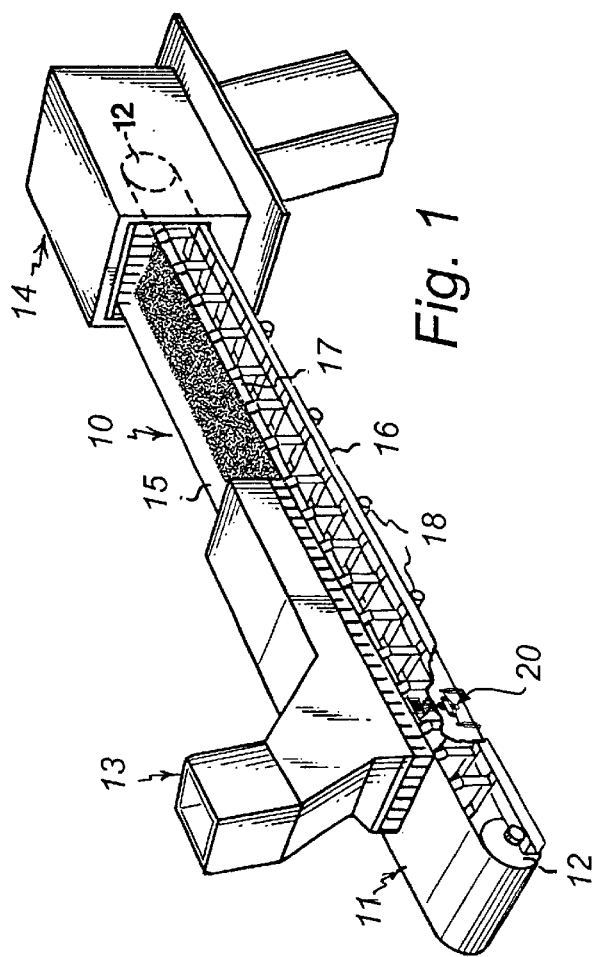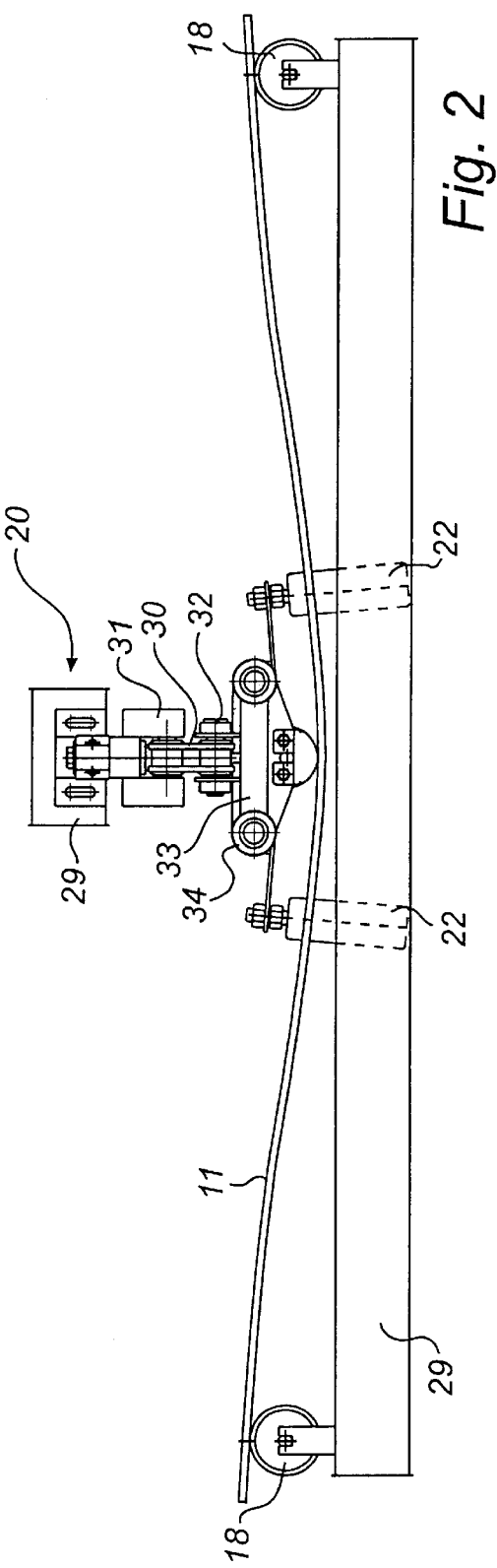

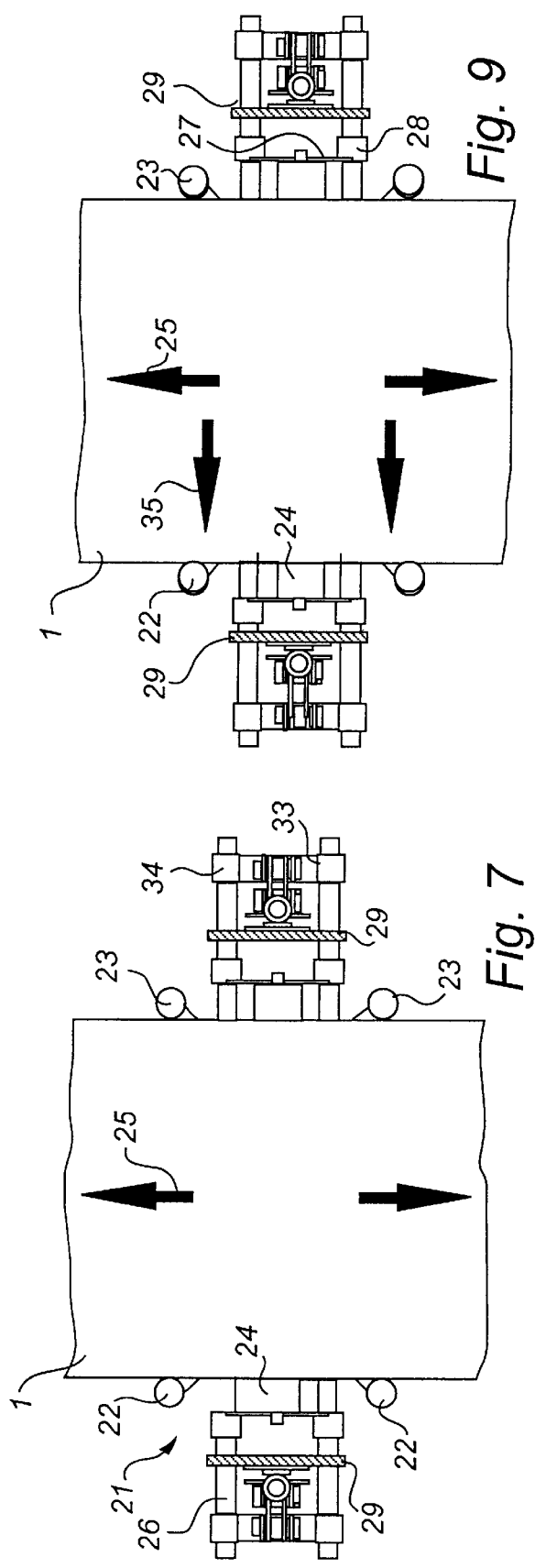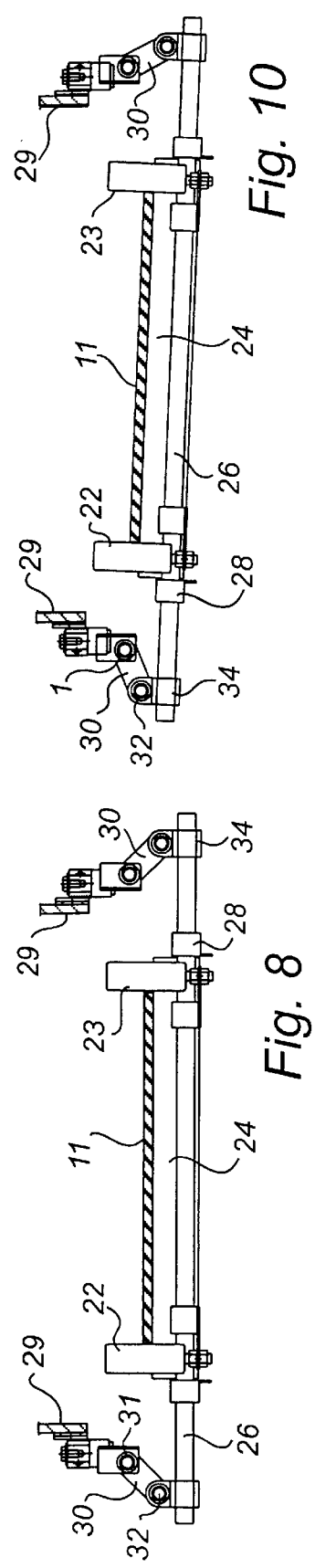

DEVICE FOR STEERING A CONVEYOR BELT

CROSS REFERENCE TO RELATED APPLICATIONS

This is a continuation of Application No. PCT/SE00/01081 filed May 26, 2000 and designating the United States.

The present invention relates to a device for steering a conveyor belt in a belt conveyor.

A common problem when operating belt conveyors is the tendency of-the conveyor belt in operation to move laterally relative to the intended path of travel through the conveyor. Lateral displacement, i.e. displacement of the conveyor belt transversely of its direction of travel, may cause, inter alia, damage to the belt by the belt edges coming into contact with fixed parts on the belt conveyor frame.

In order to solve this problem, many conveyors have been provided with one or more support rollers which support the conveyor belt during its return travel and which are manually angularly adjustable relative to the intended direction of travel of the belt. The angular orientation of these support rollers is adjusted during the running-in of the belt conveyor to ensure that in normal operational conditions the belt will travel through the conveyor in a correctly centred manner. If a tendency towards lateral displacement should arise in operation, due for instance to elongation of the conveyor belt during operation or to dirt and deposits accumulating on the end rollers of the conveyor manual postadjustment of the set angular position of these support rollers is necessary. Supplementary work is required therefor and furthermore in many cases the conveyor must be stopped during the adjustment work. By setting a support roller at an angle it is thus possible to compensate for the tendency of the belt to run out of line by moving laterally relative to its intended direction of travel.

Moreover, devices have been suggested serving to automatically adjust the conveyor for adaptation thereof to such lateral motions of the conveyor belt. Such an automatic self-adjusting or self-aligning device is shown and described in NO-C-178853 and the corresponding PCT Publication WO9514627. However, this prior-art device does not aim at adjusting the position of the belt to maintain it in a centred position relative to the centre line of the conveyor frame but at ensuring that the support rollers are constantly directed perpendicular to the conveyor belt, whether the conveyor belt is centred or not. This aim is achieved by arranging for the belt side edges to travel along edge guide rollers arranged at one end of a double-arm lever, whose other end supports a stand in which the support roller is mounted. This mounting stand, which in its simplest form is a plate, is in turn pivotally connected with the double-arm lever. When the latter pivots in response to the engagement of the guide rollers with the belt edges, the support roller will automatically set itself at right angles to the belt travelling direction. In this prior-art device, return of the belt to the intended centre line of the path of travel of the belt might be achieved as a result of the edge guide rollers trying to push the belt back to a centred position.

It has also been suggested that the belt be centred by letting it travel over a support roller stand containing two belt support rollers which are inclined and each engage a lateral edge portion of the belt in order to cup the belt around the central portion of the belt. This technique of achieving centring, however, does not always give the intended result.

An improvement in relation to these prior-art devices is described in SE-C-507733 and the corresponding WO9819943. This device for steering a conveyor belt is capable of automatically returning a conveyor belt to the intended central position along a path of travel. Thus the steering device causes the conveyor belt to move as much as possible in a centred fashion over support rollers, drive rollers and end rollers in a belt conveyor.

This prior-art device for steering a conveyor belt starts from the idea, known per se, of using a belt roller to compensate for the tendency towards lateral displacement of the belt. What differs this belt steering device from those previously known is that the angular orientation of the support roller occurs automatically and that the degree of obliqueness is determined by the extent of the lateral movement of the conveyor belt relative to the intended path of travel along the belt conveyor. For detecting the degree of displacement of the conveyor belt relative to the intended path, use is made of belt position detecting means which are connected with the belt support roller via a linkage system for pivoting in the principal plane of the belt and setting of the belt support roller in a pivoting position, in which the belt support roller, owing to its engagement with the belt, exerts a readjusting force on the belt, so that the conveyor belt is steered back and is centred relative to the intended path of travel of the belt. According to SE-C 507733 and the corresponding WO9819943, the belt readjusting means thus is a belt support roller which engages the belt and rolls against the same and which is pivotable in the principal plane of the belt, and the belt position detecting means is connected with the belt support roller via a linkage system for pivoting and adjusting the belt support roller in a pivotal position, in which the belt support roller, owing to its engagement with the belt, exerts a readjustment force on the belt.

This prior-art conveyor belt steering device functions very well but suffers from one drawback—it functions merely in one belt travelling direction. This means that the prior-art conveyor belt steering device cannot be used in conveyor belt installations having a reversible direction of travel of the conveyor belt since, when reversing the direction of travel of the belt, the belt position detecting means and the belt readjusting means must change places and also the linkage system must be turned around.

An object of the invention therefore is to provide a new conveyor belt steering device which functions well independently of the direction of travel of the conveyor belt and which therefore can be used also for conveyor belt installations with reversible conveyor belts.

The invention is based on the per se known idea of using belt position detecting means which detect the lateral position of the conveyor belt relative to the intended path of travel of the belt and which are operatively connected with belt readjusting means which actuate the conveyor belt to be returned to the intended centred position along the intended path of travel of the belt. The novel feature of the invention is how the belt readjusting means is designed and connected with the belt position detecting means and how the readjustment of the conveyor belt occurs.

That characterising the invention is stated in the independent claim while the dependent claims define particularly preferred embodiments of this invention.

To sum up, the invention can be considered to reside in belt position detecting means and belt readjusting means being arranged on a roller cradle which is connected with a frame by means of inclined links for pivoting and setting the belt roller in a pivoting position, in which the belt support roller is inclined to exert, by engaging the belt, a readjustment force on the same.

The invention will be now be described in more detail with reference to the accompanying drawings which illustrate a few embodiments of a belt steering device according to the present invention.

FIG. 1 is a schematic view of a belt conveyor provided with a belt steering device according to the present invention.

FIG. 2 is an end view of a first preferred embodiment of a belt steering device according to the present invention.

FIG. 7 is a top plan view of a second preferred embodiment of a belt steering device according to the invention in its position when the conveyor belt travels in a centred manner along the intended path of travel through the belt conveyor.

FIG. 8 is an end view of the same belt steering device as in FIG. 7, with a section through the conveyor belt.

FIG. 9 illustrates the same belt steering device as in FIG. 7 but in a position in which the belt has been displaced in one direction relative to its intended centred position and in which the belt support roller of the belt steering device has been automatically inclined to return the belt to the intended centred position.

FIG. 10 is an end view of the same belt steering device as in FIG. 9, with a section through the conveyor belt.

Figure 3:
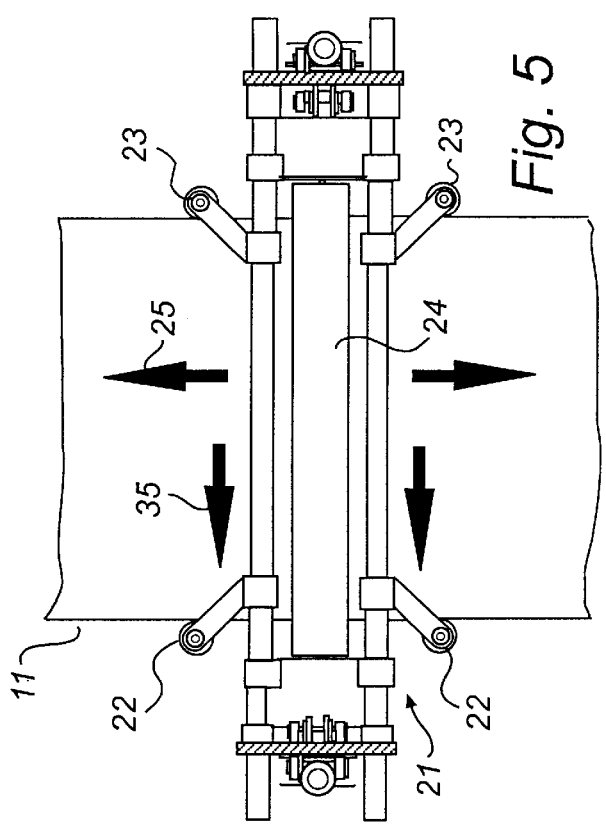
FIG. 3 is a top plan view of the belt steering device shown in FIG. 2 in its position when the conveyor belt travels in a centred manner along the intended path of travel through the belt conveyor.

FIG. 1 illustrates schematically a belt conveyor 10. It comprises an endless conveyor belt 11 which travels between end and drive rollers 12. The belt conveyor has a loading station 13 and an unloading station 14. To support the upper run of the conveyor belt between the end rollers 12 there are belt support rollers 17. Also under its return run 16, the belt is supported by means of belt support rollers 18, which, however, can be arranged at a greater distance from each other than the belt support rollers 17. According to the invention, the belt conveyor is provided with an automatic belt steering device 20, which in this embodiment is placed along the return run 16 close to the loading end of the belt conveyor. Within the scope of the invention, a belt conveyor can have a plurality of such belt steering devices 20.

A preferred embodiment of the belt steering device 20 is shown in more detail in FIGS. 2–6. The belt steering device comprises a roller cradle 21, which supports two belt position detecting means 22, 23 and a belt support roller 24 which is directed essentially transversely of the intended path of the travel of the conveyor belt (arrows 25). In the shown embodiment, the roller cradle has two transverse bars 26. Roller holders 27 are arranged between the bars 26 and attached thereto by means of sleeves 28. In the shown embodiment, two belt detecting means 22 are arranged on one side of the conveyor belt and two belt detecting means 23 on the other side of the conveyor belt, so that the forces exerted on the roller cradle when the conveyor belt moves in the lateral direction, are equalised. However, it is also possible to use only-one belt detecting means on each side of the conveyor belt.

The belt position detecting means 22, 23 are in the form of rollers which are rotatably mounted to roll against the edges of the conveyor belt in operation.

The roller cradle 21 is connected with the frame stand 29 of the conveyor belt installation by means of links 30. The links are pivotable on a pivot 31 on the frame and a pivot 32 on the roller cradle 21 and are inclined because the distance between the pivots 31 on the frame is greater than the distance between the pivots 32 on the roller cradle 21. The pivots 31, 32 on the roller cradle 21 are attached to a crossbar 26 with end sleeves 34, through which the bars 26 are passed and which are attachable to the bars 26 in a suitable position for controlling the distance between the pivots 32 and, thus, the angle of the links relative to the bars. In this example, there are double links at each end of the roller cradle, but in certain cases one link at each end may be sufficient.

The conveyor belt 11 travels in contact with the belt support roller 24 on the far side of the bars 26 of the roller cradle. A pressing force is maintained between the conveyor belt and the belt support roller 24 due to the fact that the belt roller, as is evident from FIG. 2, is arranged in such a position that the conveyor belt is pressed downwards between two successive belt support rollers 18 in the conveyor belt installation.

Figure 4:
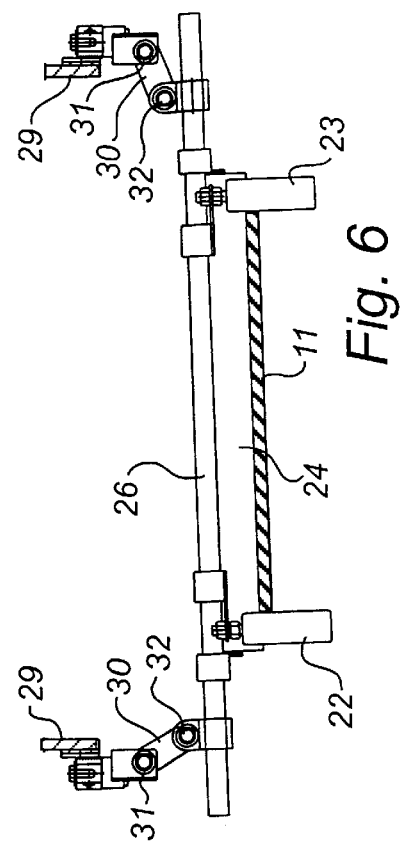
FIG. 4 is an end view of the belt steering device in FIG. 3 with a section through the conveyor belt.
Figure 5:
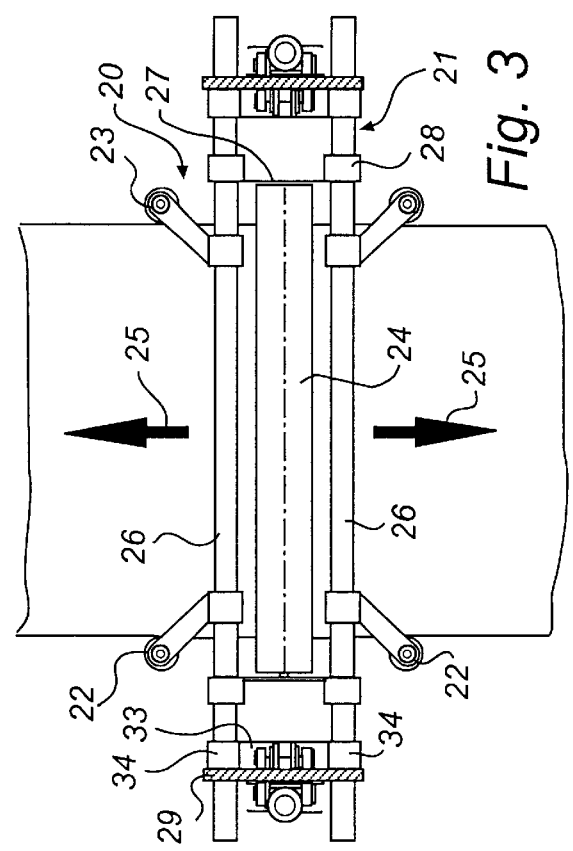
FIG. 5 illustrates the same belt steering device as in FIG. 3 but in a position in which the belt has been displaced in one direction relative to its intended centred position and in which the belt support roller of the belt steering device has been automatically inclined to return the belt to the intended centred position.
Figure 6:
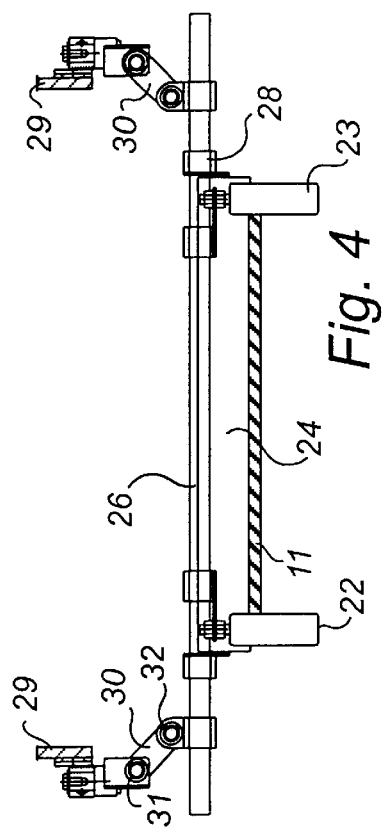
FIG. 6 is an end view of the same belt steering device as in FIG. 5, with a section through the conveyor belt.

The function of the device is evident when comparing FIGS. 3 and 4 with FIGS. 5 and 6. In FIGS. 3 and 4, the conveyor belt 11 travels in its neutral position along the intended path of the travel. If the conveyor belt for one reason or another should begin to move to the left in respect of FIGS. 3 and 4, the left edge of the conveyor belt will be caught by the belt position detecting means or rollers 22, which consequently will be displaced to the left (arrows 35). Since the rollers 22 are connected with the bars 26 and cannot be displaced along the same, this will cause the roller cradle to be pivoted downwards at the left side (with respect to FIGS. 4 and 6), so that the entire roller cradle is inclined. The inclination causes in turn the left edge of the conveyor belt to have a longer path of travel and thus conveyor belt begins to move back to the starting position (the neutral position according to FIGS. 3 and 4).

If the belt should move to the right, the effect will be the opposite, i.e. inclination of the roller cradle in the other direction and return of the belt from the right to the left.

Since the inclination of the belt support roller 24 occurs in a plane which is angled to the principal plane of the conveyor belt, this conveyor belt steering device is independent of the direction in which the conveyor belt moves through the belt steering device. This means that the conveyor belt steering device will function automatically and in a correct manner also when reversing the belt travelling direction in the conveyor belt installation. This is in contrast to the currently best known belt steering device as disclosed in SE-C-507733 and the corresponding WO9819943.

The embodiment according to FIGS. 7–10 differs from the embodiment according to FIGS. 2–6 only in respect of how the links are angled and how the conveyor belt engages the belt support roller 24. In this case, the conveyor belt is located on the same side of the roller cradle as the pivots 31 on the frame 29. For a lateral displacement of the conveyor belt 11 to be corrected and the belt be returned to the intended neutral position, the links 32 must be inclined in opposite directions, i.e. the distance between the pivots 31 of the frame is shorter than the distance between the pivots 32 of the roller cradle. Otherwise, this conveyor belt steering device works in the same manner as the steering device according to FIGS. 2–6. However, there is one difference since, in the steering device according to FIGS. 2–6, the conveyor belt has been forced to travel in an arcuate form between two belt support rollers 18 for the belt to travel with pressing force in contact with the belt support roller 24. In the steering device according to FIGS. 7–10, the required pressing force is achieved by the belt being pressed by gravity against the belt support roller 24.

Figure 11:
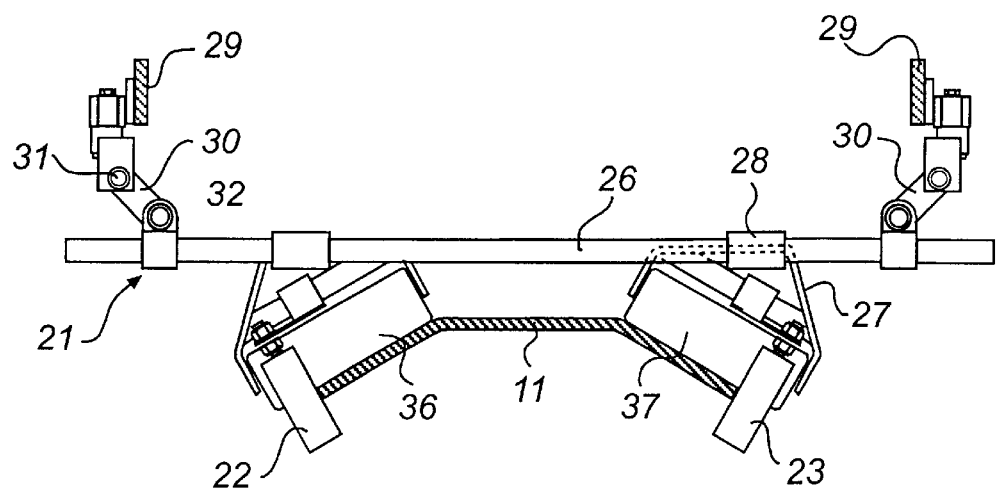
FIG. 11 illustrates a third embodiment which corresponds to the embodiment according to FIGS. 2–6 but which has inclined belt support rollers for cupping the conveyor belt.
Figure 12:
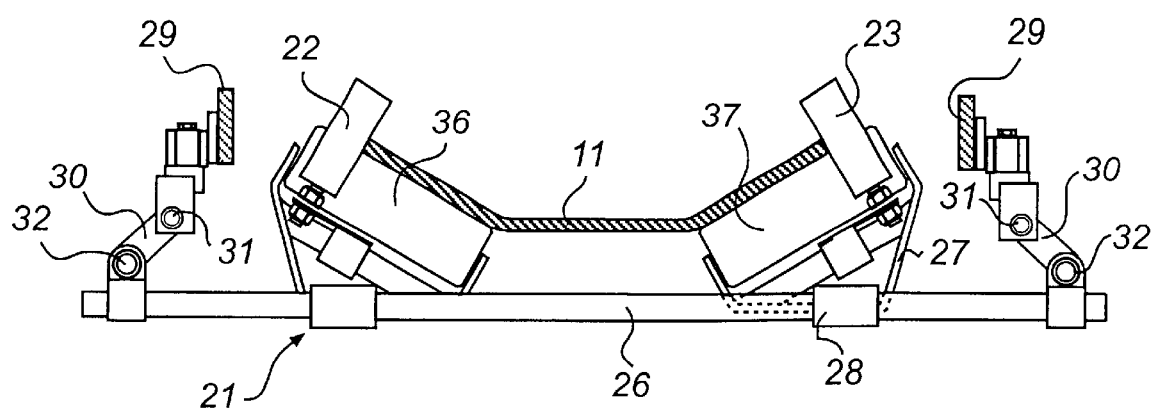
FIG. 12 illustrates a fourth embodiment which corresponds to the embodiment according to FIGS. 7–10 but which has inclined belt support rollers for cupping the conveyor belt.

FIGS. 11 and 12 illustrate two more embodiments of the invention. In these two cases, the belt support roller 24 is replaced by two angled belt support rollers 36, 37 which bear on opposite rim portions of the conveyor belt 11 in order to cup the same. Consequently, also the belt position detecting means or rollers 22, 23 have been inclined to a corresponding degree in order to roll against the lateral edges of the cupped conveyor belt. Also in this case, the roller cradle has two parallel bars 26, on which the various components are attachable by means of sleeves 28, 34.

In one embodiment (not shown), the central portion of the belt can also be supported by a belt support roller which in that case is arranged between the two angled belt support rollers 36, 37 in FIGS. 11 and 12.

As mentioned above, the links 30 are inclined in one or the other direction according to the side of the belt support roller that is pressed against the conveyor belt. The degree of inclination of the links may vary although an angle of 45° has been selected. Both the angle and the length of the links affect the degree of inclination of the roller cradle when the conveyor belt is displaced laterally. A greater degree of inclination causes a quicker return of the conveyor belt to the neutral position. A person skilled in the art can, by simple tests, determine the degree of inclination which is most convenient in the individual case.

What is claimed is:

1. A belt steering device for adjusting the lateral position of a conveyor belt relative to an intended belt traveling path, comprising a frame and belt position detecting and readjusting means, which have at least one belt support roller arranged for pivotal movement relative to the frame and engaging the belt, and which have belt position detecting means operatively connected with the belt support roller and intended for pivoting and setting the belt roller in a pivoting position, in which the belt roller by its engagement with the belt exerts a readjustment force thereon, characterized in that the belt support roller and the belt position detecting means are arranged on a roller cradle, that the roller cradle is pivotally connected with the frame by means of at least one inclined link on each side of the intended path of travel of the conveyor belt, each inclined link being pivotable to change inclination of the roller cradle with respect to an unbiased plane of the conveyor belt, that the inclined links are at one end articulated to the frame by a first pivot and at their other end articulated to the roller cradle by a second pivot, the distance between the first pivots arranged on either side of the belt differing from the distance between the second pivots arranged on either side of the belt, and that the belt position detecting means are attached to the roller cradle.

2. A belt steering device as claimed in claim 1, characterized in that the distance between said first pivots on the frame is shorter than the distance between said second pivots on the roller cradle, and that the roller cradle and its belt support roller are adapted to bias the conveyor belt in a direction away from said first pivots of the frame.

3. A belt steering device as claimed in claim 1, characterized in that the distance between said first pivots on the frame is longer than the distance between said second pivots on the roller cradle, and that the roller cradle and its belt support roller are adapted to bias the conveyor belt in a direction toward said first pivots of the frame.

4. A belt steering device as claimed in claim 1, characterized in that the roller cradle comprises belt support rollers which are inclined with respect to the unbiased plane of the conveyor belt for cupping the conveyor belt.

5. A belt steering device as claimed in claim 1, characterized in that on each side of the intended path of travel of the conveyor belt, the roller cradle has two belt position detecting means which are arranged at a distance from one another, seen in the direction of travel of the conveyor belt.

6. A belt steering device as claimed in claim 1, characterized in that the links are inclined at an angle of about 45° to the roller cradle.

7. A belt steering device for adjusting the lateral position of a conveyor belt relative to an intended belt traveling path, the intended belt traveling path defining an unbiased belt plane, the belt steering device comprising:
    a frame;
    a first link pivotally connected to the frame at a first link/frame pivot point;
    a second link pivotally connected to the frame at a second link/frame pivot point;
    a roller cradle supporting a belt support roller for engaging the belt, the roller cradle arranged for pivotal movement relative to the frame, the roller cradle being pivotally connected to the first link at a first link/cradle pivot point, the roller cradle being pivotally connected to the second link at a second link/cradle pivot point, wherein the distance between the first link/frame pivot point and the second link/frame pivot point is different from the distance between the first link/cradle pivot point and the second link/cradle pivot point; and
    a belt position detector operatively connected with the belt support roller, such that lateral movement of the belt causes pivoting of the first and second links such that relative incline between the belt support roller and the unbiased belt plane is changed as a function of lateral belt position.

8. A belt steering device for adjusting the lateral position of a conveyor belt relative to an intended belt traveling path, comprising:
    a frame;
    a roller cradle pivotally connected to the frame by at least one link on each side of the conveyor belt, said links being inclined with respect to the conveyor belt;
    a first pivot articulating one end of each link to the frame;
    a second pivot articulating the other end of each link to the roller cradle;
    the distance between the first pivots arranged on either side of the belt differing from the distance between the second pivots arranged on either side of the belt;
    a belt support roller arranged for pivotal movement relative to the frame and engaging the belt; and
    belt position detecting means operatively connected with the belt support roller and intended for pivoting the belt support roller so that the belt roller by its engagement with the belt exerts a force thereon.

* * * * *